US007626637B2

(12) United States Patent
Chiu et al.

(10) Patent No.: US 7,626,637 B2
(45) Date of Patent: Dec. 1, 2009

(54) METHOD AND APPARATUS FOR CAPTURING FULL-SCREEN FRAMES

(75) Inventors: Kao-Yi Chiu, Taipei (TW); Yu-Hsuan Lai, Taipei (TW)

(73) Assignee: Asustek Computer Inc., Taipei (TW)

( * ) Notice: Subject to any disclaimer, the term of this patent is extended or adjusted under 35 U.S.C. 154(b) by 824 days.

(21) Appl. No.: 11/358,404

(22) Filed: Feb. 22, 2006

(65) Prior Publication Data

US 2006/0227625 A1 Oct. 12, 2006

(30) Foreign Application Priority Data

Feb. 24, 2005 (TW) .............................. 94105673 A

(51) Int. Cl.
*H04N 5/44* (2006.01)
*H04N 5/445* (2006.01)

(52) U.S. Cl. ....................... 348/559; 348/739; 348/567; 348/715; 345/545; 345/539

(58) Field of Classification Search ................. 348/559, 348/739, 715, 567; 345/545, 547, 537, 538, 345/539
See application file for complete search history.

(56) References Cited

U.S. PATENT DOCUMENTS 5,878,248 A 3/1999 Tehranian et al.
6,351,291 B1 * 2/2002 Asano ........................ 348/564
7,064,765 B2 * 6/2006 Hochmuth et al. .......... 345/545
2002/0180744 A1 * 12/2002 Takala et al. ................ 345/545
2004/0189677 A1 9/2004 Amann et al.

FOREIGN PATENT DOCUMENTS

CN 1532687 9/2004
TW 1235333 7/2005

* cited by examiner

*Primary Examiner*—David L Ometz
*Assistant Examiner*—Jean W Désir
(74) *Attorney, Agent, or Firm*—Rabin & Berdo, P.C.

(57) ABSTRACT

An apparatus for capturing full-screen frames, which are displayed by a display unit having a first display buffer and a second display buffer, in real time. The display unit selects one of the first and second display buffers as a front buffer for displaying the full-screen frames. The apparatus includes a capture unit, and a display driver unit for driving the display unit. When data in the front buffer is updated, the display driver unit generates image data and saves the image data in a temporary buffer. Then, the display driver unit copies the image data to a share buffer. The capture unit reads the image data from the share buffer and generates a video bitstream accordingly.

20 Claims, 2 Drawing Sheets

100

METHOD AND APPARATUS FOR CAPTURING FULL-SCREEN FRAMES

This application claims the benefit of Taiwan application Serial No. 94105673, filed Feb. 24, 2005, the subject matter of which is incorporated herein by reference.

BACKGROUND OF THE INVENTION

1. Field of the Invention

The invention relates in general to a frame capture apparatus, and more particularly to an apparatus and a method for capturing full-screen frames in real time.

2. Description of the Related Art

Nowadays, the online game is to be fashionable on the game world. There is a need for live broadcasting for someone who is not on-site can see the live match. If the match is processing the live broadcast, normally, someone utilizes a camera to shoot the computer monitor or outputs the analog video from the computer monitor frame. For example: the composite video broadcasts on television. If the video is to be broadcasted on the network, the analog video has to be converted into a digital video by way of video conversion. However, the frames may have deteriorated quality after several times of conversions, and the complicated converting procedure increases the cost of constructing a network broadcast station.

The available frame capturing software may be used to capture the frame on the computer. In the computer with Microsoft Windows Operating System, the key, Print Screen, may be used to capture the frame on the monitor. However, these methods are available for capturing a single frame only, and the typical game software is usually executed in a full-screen mode so that the displayed frame cannot be captured by the above-mentioned methods. Because the full-screen frame on the computer cannot be directly captured and converted into the video bitstream, it is disadvantageous to the live game broadcast on the network.

SUMMARY OF THE INVENTION

It is therefore an object of the invention to provide an apparatus and a method of capturing full-screen frames in real time.

The invention achieves the above-identified object by providing an apparatus of capturing full-screen frames displayed by a display unit. The display unit has a first display buffer and a second display buffer and selects one of the first and second display buffers as a front buffer for displaying the full-screen frames. The apparatus includes a display driver unit and a capture unit. The display driver unit drives the display unit. When data in the front buffer is updated, the display driver unit generates image data and saves the image data to a temporary buffer and then copies the image data from the temporary buffer to a share buffer. The capture unit reads the image data from the share buffer and generates a video bitstream according to the image data.

The invention achieves the above-identified object by providing a method of capturing full-screen frames in real time. First, image data is generated and saved to a temporary buffer when data in a front buffer is updated. Next, the image data in the temporary buffer is copied to a share buffer. Then, the image data in the share buffer is read and a video bitstream is generated according to the image data.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
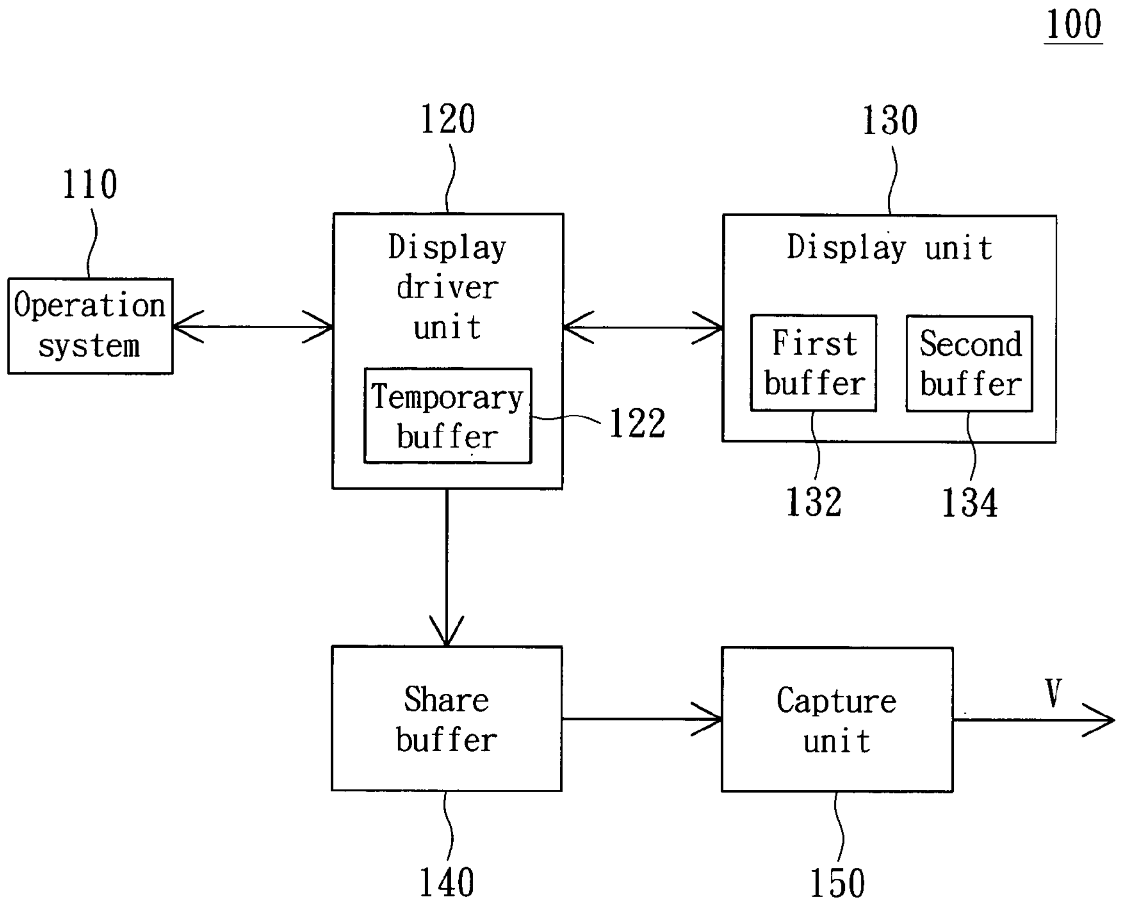
FIG. 1 is a schematic illustration showing a computer system capable of capturing full-screen frames in real time according to a preferred embodiment of the invention.

FIG. 1 is a schematic illustration showing a computer system capable of capturing full-screen frames in real time according to a preferred embodiment of the invention. Referring to FIG. 1, a capture apparatus 100 includes a display driver unit 120 and a capture unit 150. The capture apparatus 100 is disposed in a computer, which includes an operation system 110 and a display unit 130. The operation system 110 enables the display unit 130 to output frame data through the display driver unit 120, and the display unit 130 may be a video card or a display circuit built in a system chip.

When the program, such as a computer game especially having three-dimensional animation, is executed in a full-screen mode, the frame update speed has to be high enough such that the frame smoothness is not influenced. The display unit 130 uses a first buffer 132 and a second buffer 134 to write the frame data alternately such that the waiting time for writing data can be shortened. The methods of using two buffers can be classified into two types including a flipping type and a blitting type. The flipping type is to alternately regard the first buffer 132 and the second buffer 134 as a front buffer and a back buffer. That is, when the first buffer 132 serves as the front buffer, the frame data is to be outputted to the monitor. At this time, the next frame data is written into the second buffer 134 which serves as the back buffer. Next, the second buffer 134 serves as the front buffer, and the frame data thereof is to be outputted to the monitor. At this time, the next frame data is to be written into the second buffer 134 which serves as the back buffer. The blitting type is to fixedly use the first buffer 132 as the front buffer and to write the data from the second buffer 134 to the first buffer 132 when the frame data is to be updated.

Because the typical application program cannot directly access the first buffer 132 and the second buffer 134 in the display unit 130, the full-screen frame cannot be captured. This embodiment captures the frame data in the front buffer when the display driver unit 120 is updating the frame. After converting the video format and resolution of the frame data, the converted frame data is stored in a temporary buffer 122. Next, the display driver unit 120 tries to obtain the token of a share buffer 140. If the token is obtained, the data in the temporary buffer 122 is copied to the share buffer 140. The capture unit 150 reads the data in the share buffer 140 after the token of the share buffer 140 is obtained, and generates a video bitstream V for output.

The temporary buffer 122 may be a memory for the display driver unit 120 to request the allocation from the operation system. The share buffer 140 is a memory for the capture unit 150 to request the allocation from the operation system. The share buffer 140 is shared between the display driver unit 120 and the capture unit 150 and the share buffer 140 has the token to avoid conflict therebetween because the share buffer 140 cannot be accessed until the token is obtained.

Figures 2A, 2B:
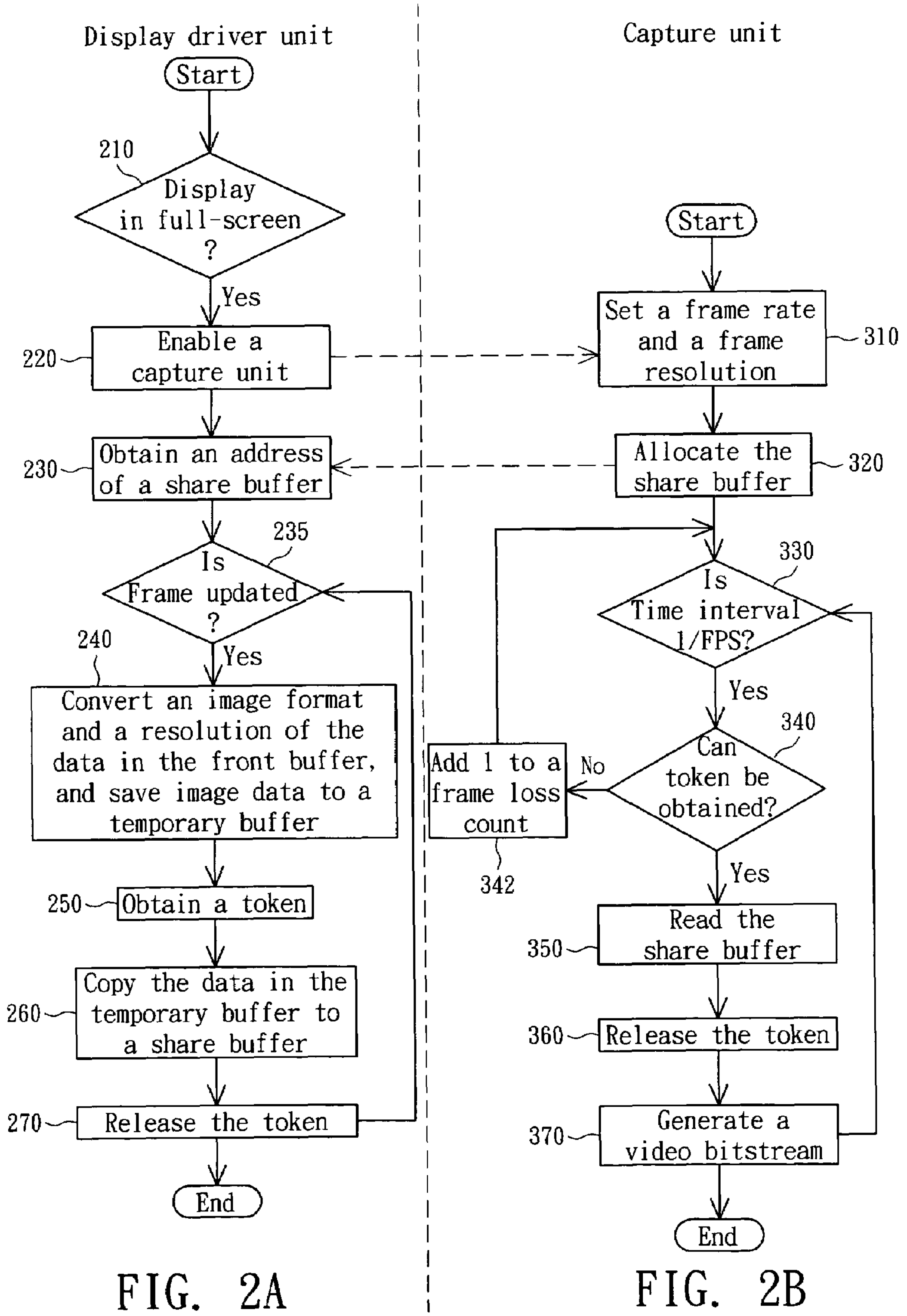
FIGS. 2A and 2B are flow charts showing the method of capturing full-screen frames.

FIGS. 2A and 2B are flow charts showing the method of capturing full-screen frames. FIG. 2A is a flow chart showing a capturing method of the display driver unit. First, the display driver unit 120 judges whether the application program is to be executed in a full-screen mode (step 210). If yes (step 220), the capture unit are enabled. Next, the address of the share buffer 140 outputted from the capture unit 150 is obtained (step 230). Then, the image format and resolution of the data of the front buffer is converted when the frame is updated, and the converted data is saved to the temporary buffer 122 (step 235). For example, the image format conversion is to convert the frame with the RGB format into the frame with the YUV format, and the resolution conversion is to convert the resolution of 1024×768 into the resolution of 320×240.

Next, the token capable of accessing the share buffer 140 is obtained (step 250). Then, the data of the temporary buffer 122 is copied to the share buffer 140. After the token is released (step 270), the capturing of one frame is completed. That is, the display driver unit 120 executes steps 240 to 270 each time when the frame is updated so as to save the captured frame into the share buffer 140.

FIG. 2B is a flow chart showing a capturing method of the capture unit 150. First, it is possible to ask the user whether or not the full-screen frame has to be captured after the display driver unit 120 is enabled. If yes, the frame rate and the frame resolution are set (step 310). Then, the display driver unit 120 asks the operation system to allocate the share buffer 140 (step 320) and transfer the address of the share buffer 140 to the display driver unit 120. Next, the capture unit 150 reads the data of the share buffer 140 every constant time gap according to the frame rate. Taking the frame rate of 60 Hz as an example, 60 frames have to be read in one second. So, the FPS (frame per second) is 60, and the time gap is 1/FPS=0.017 second. That is, the capture unit 150 captures the data of one frame every 0.017 second by executing steps 340 to 370.

In step 340, it is asked to get the token of the share buffer 140. If the token cannot be obtained, it means that the share buffer 140 is being occupied. Thus, this frame capturing process fails and 1 is added to the frame loss count (step 342). If the token is obtained, step 350 is executed.

In step 350, the capture unit 150 reads the data of the share buffer 140 and then releases the token after the reading procedure (step 360). Next, the capture unit 150 combines the captured audio with the read frames to generate the video bitstream V (step 370). The video bitstream V may be transferred on the network or saved as a file.

The apparatus and method for capturing full-screen frames according to the embodiments of the invention can capture frames of the executing application program in the full-screen mode and further convert the frames into the video bitstreams.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for capturing full-screen frames displayed by a display unit and the display unit having a first display buffer and a second display buffer and one of those display buffers being selected as a front buffer for displaying the full-screen frames, the apparatus comprising:

a display driver unit for driving the display unit, generating an image data and saving the image data to a temporary buffer when the data in the front buffer being updated, and copying the image data from the temporary buffer to a share buffer; and a capture unit for reading the image data from the share buffer and generating a video bitstream according to the image data.

2. The apparatus according to claim 1, wherein the display driver unit does not write the image data to the share buffer until a token is obtained.

3. The apparatus according to claim 2, wherein the capture unit does not read the image data of the share buffer until the token is obtained.

4. The apparatus according to claim 1, wherein the display driver unit converts a resolution of the data in the front buffer and then generates the image data.

5. The apparatus according to claim 1, wherein the display driver unit converts a signal format of the data in the front buffer and then generates the image data.

6. The apparatus according to claim 1, wherein the capture unit reads the share buffer every time gap, which is determined according to a frame rate of the video bitstream.

7. The apparatus according to claim 6, wherein the capture unit scrounges a token capable of accessing the share buffer every time gap and reads the share buffer after the token is obtained.

8. The apparatus according to claim 6, wherein the capture unit scrounges a token capable of accessing the share buffer every time gap and records a frame loss count value if the token is not obtained.

9. The apparatus according to claim 1, wherein the display unit selects only the first display buffer as the front buffer.

10. The apparatus according to claim 1, wherein the display unit alternately selects the first display buffer or the second display buffer as the front buffer.

11. A method of capturing full-screen frames displayed by a display unit, the display unit having a first display buffer and a second display buffer and one of those display buffers being selected as a front buffer for displaying the full-screen frames, the method comprising the steps of:

generating an image data and saving the image data to a temporary buffer when the data in the front buffer being updated;

copying the image data in the temporary buffer to a share buffer; and reading the image data from the share buffer and generating a video bitstream according to the image data.

12. The method according to claim 11, wherein the step of copying the image data comprises the step of writing in the share buffer when a token is obtained.

13. The method according to claim 12, wherein the step of reading the image data comprises the step of reading on the share buffer when a token is obtained.

14. The method according to claim 11, wherein the step of generating the image data is processing the front buffer data to convert a resolution and then generating the image data.

15. The method according to claim 11, wherein the step of generating the image data is processing the front buffer data to convert a signal format and then generating the image data.

16. The method according to claim 11, wherein the step of reading the image data is reading the share buffer after every time gap, wherein the time gap is determined according to a frame rate of the video bitstream.

17. The method according to claim 16, wherein the step of reading the image data is catching a token for accessing the share buffer after every time gap and reading the image data after the token is obtained.

18. The method according to claim 16, wherein the step of reading the image data is a token for accessing the share buffer after every time gap and recording a frame loss count value if the token is not obtained.

19. The method according to claim 11, wherein the display unit only selects the first display buffer as the front buffer.

20. The method according to claim 11, wherein the display unit alternately selects the first display buffer and the second display buffer as the front buffer.

* * * * *

UNITED STATES PATENT AND TRADEMARK OFFICE

CERTIFICATE OF CORRECTION

PATENT NO. : 7,626,637 B2
APPLICATION NO. : 11/358404
DATED : December 1, 2009
INVENTOR(S) : Chiu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 954 days.

Signed and Sealed this

Second Day of November, 2010

David J. Kappos
*Director of the United States Patent and Trademark Office*